United States Patent
Swan

[11] Patent Number: 5,971,512
[45] Date of Patent: Oct. 26, 1999

[54] OUTRIGGER SUPPORTED UTILITY CART

[76] Inventor: Dana W. Swan, 112 S. Monica Cir., Newbury Park, Calif. 91320

[21] Appl. No.: 08/934,274

[22] Filed: Sep. 19, 1997

Related U.S. Application Data

[60] Provisional application No. 60/026,562, Sep. 23, 1996.

[51] Int. Cl.[6] .................................................. B62B 3/02
[52] U.S. Cl. .................. 312/281; 211/144; 211/131.1; 312/300; 312/249.12; 248/283.1; 248/285.1; 280/293; 280/38
[58] Field of Search .................................. 312/280, 281, 312/249.8, 249.11, 249.13, 209, 326, 300, 196, 317.1, 317.3, 249.12; 211/110, 144, 131.1; 108/103, 105, 108, 139, 140, 141, 49, 147.11, 147.17, 42; 248/129, 283.1, 285.1, 131; 280/293, 38, 42, 47.35, 47.16

[56] References Cited

U.S. PATENT DOCUMENTS

| | | | |
|---|---|---|---|
| 1,272,015 | 7/1918 | Davis | 108/141 |
| 1,283,869 | 11/1918 | Nelson et al. | 108/141 |
| 1,472,570 | 10/1923 | Snider | 312/281 X |
| 1,894,991 | 1/1933 | Hayes | 108/140 X |
| 2,535,112 | 12/1950 | Woody | 108/49 X |
| 2,716,045 | 8/1955 | Berner | 312/281 |
| 3,509,831 | 5/1970 | Schnetzer | 248/131 X |
| 4,934,766 | 6/1990 | Schmidt et al. | 312/209 X |
| 4,952,908 | 8/1990 | Sanner | 340/429 |
| 4,976,450 | 12/1990 | Ellefson | 280/47.35 X |
| 5,058,911 | 10/1991 | Hunter et al. | 280/47.35 |
| 5,184,601 | 2/1993 | Putman | 312/209 X |
| 5,221,132 | 6/1993 | Combs et al. | |
| 5,540,160 | 7/1996 | Rea. | |

FOREIGN PATENT DOCUMENTS

| | | | |
|---|---|---|---|
| 2552985 | 4/1985 | France | 108/42 |
| 2247807 | 4/1974 | Germany | 312/281 |
| 3506381 | 8/1986 | Germany | 312/223.3 |

*Primary Examiner*—Peter M. Cuomo
*Assistant Examiner*—Janet M. Wilkens
*Attorney, Agent, or Firm*—Gene Scott-Patent Law & Venture Group

[57] ABSTRACT

A utility cart having box construction and mobile support such as a set of caster wheels, holds a vertical shaft which engages one or more trays in positions above the cart. The trays are movable to selected positions vertically on the shaft and also are rotatable about the shaft so as to be placed conveniently for reaching tools and parts on the trays from a work position. Because the trays may be positioned laterally to one side of the cart, and are designed to be laden with heavy objects and tools, the cart further provides an outrigger leg attached to the vertical shaft at the floor. This leg is movable with the shaft so that by swinging a tray outboard of the cart, the outrigger leg is also positioned to stabilize the utility cart.

11 Claims, 3 Drawing Sheets

5,971,512

OUTRIGGER SUPPORTED UTILITY CART

The application is based upon and claims the filing date of the previously filed Provisional patent application Ser. No. 60/026,562 filed on Sep. 23, 1996.

BACKGROUND OF THE INVENTION

1. Field of the Invention

This invention relates generally to utility carts, and more particularly to an improved cart having outrigger supports for stabilization when, or example, a tool laden convenience tray is cantilevered to one side of the cart.

2. Description of Related Art

The following art defines the present state of this field:

Combs et al., U.S. Pat. No. 5,221,132 describes a tool storage system that is comprised of a framework, one or more pivot pins, a plurality of swinging arms, and an attachment assembly for each swinging arm. The framework is configured to attach to the front, top, or end of a conventional tool cabinet or to be constructed as part of a custom tool cabinet. The pivot pins are connected to the framework in a manner that permits their removal. Each swinging arm is connected to an attachment assembly which is pivotally mounted to one of the pivot pins, thereby permitting the swinging arms to pivotally swing from a storage mode to a ready access position. Each swinging arm comprises a magnetic material to which tools may be secured by magnetic attraction. Since the swinging arms swing into a position for ready access, tools may be magnetically secured to both the front and back of each swinging arm. For large and/or heavy tools, two or more adjacent swinging arms may be used to secure the tools. Also, each swinging arm may be secured in the storage mode by a latch.

Rea, U.S. Pat. No. 5,540,160 describes a sewings work station which has a plurality of work positions. The sewing station includes a horizontal top having a first work surface adapted to support a first sewing machine, a second work surface at an angle to the first work surface adapted to support a second sewing machine, and a bottom surface. A plurality of vertically adjustable legs support the top and include leg adjusters adapted to simultaneously adjust the length the legs equal amounts, whereby the top may be positioned at different operators. In the preferred embodiment, the sewing station further includes an articulated arm having a fixed end attached to the station and a free end movable between positions in front of the first and second work surfaces, and a chair mounted on the free end of the arm.

The prior art teaches utility carts of various types and configurations. However, the prior art does not teach a utility cart having a rotationally mounted tray and a means for countering the off-center weight of the cantilevered tray which is positionable lateral to the cart. The present invention fulfills these needs and provides further related advantages as described in the following summary.

SUMMARY OF THE INVENTION

The present invention teaches certain benefits in construction and use which give rise to the objectives described below. The present invention provides a utility cart having box construction and a means for mobile support such as a set of caster wheels. The cart further includes a vertical shaft which supports one or more trays. The trays are positionable vertically on the shaft and also are rotatable around the shaft so as to be positioned conveniently for reaching tools and parts on the trays. Since at least one of the trays may be positioned laterally to the outside of the cart, a problem in stability is presented. If the tray is laden with heavy objects or tools and is positioned to one side of the cart, a significant destabilizing force may be placed on the cart, and it is not inconceivable that the cart may tend to fall to the side where the tray is positioned. In order to avoid the development of such a situation, yet still enable the outplacement of the tray, an outrigger support is attached to the vertical shaft. This support moves with the shaft so that as the tray is moved so does the outrigger support which rolls on the floor surface.

A primary objective of the present invention is to provide a utility cart with rotatable trays that may be positioned within convenient reach of a mechanic located to one side of the cart, and additionally, having further advantages not taught by the prior art.

Another objective is to provide such a cart having vertically positionable trays for adapting the level of tool or part placement.

A further objective is to provide such a cart that provides adjustment of the trays laterally both rotationally as well as linearly from a support of the cart.

A still further objective of the present invention is to provide such positionable trays and an outrigger stabilizing support that is adapted to move with the placement of the trays so as to stabilize the cart against a cantilevered laterally positioned weight.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
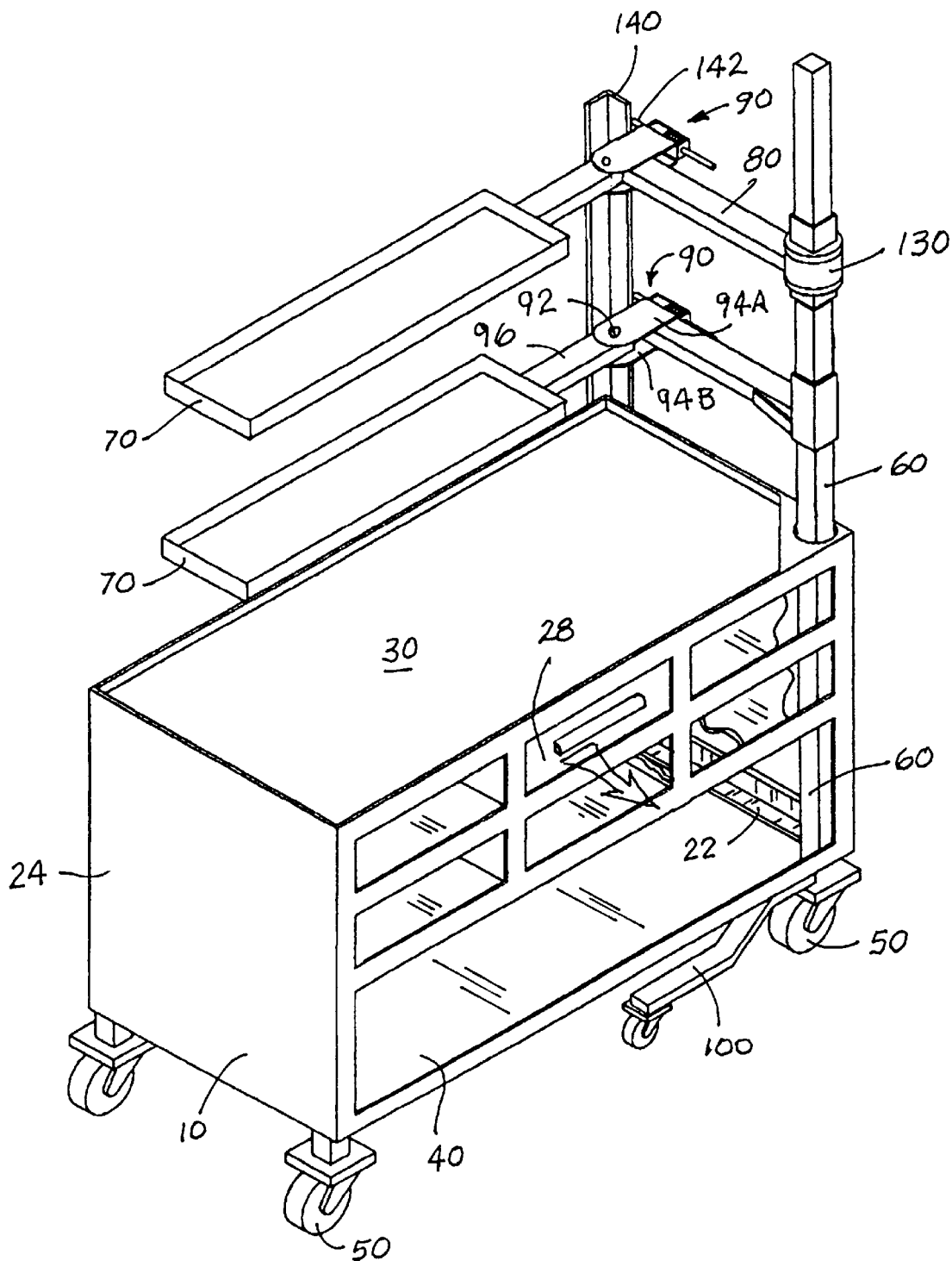
FIG. 1 is a perspective view of the preferred embodiment of the present invention, a utility cart, showing movable trays of the invention in positions over the top surface of the cart.

The above described drawing figures illustrate the invention, a utility cart apparatus supported by a structural floor such as a building surface or an outdoor yard or road surface. The apparatus comprises a box 10 having a sidewall means 20 such as the sheet panels illustrated. However, the box 10 may be fully enclosed or it may comprise an open frame or other structural configurations well known in the art as desired and necessary for the many uses that such apparatus may be adapted for. In an important embodiment of the invention, where it is used as a tool cart, as shown in FIG. 1, the sidewall means 20 is preferably constructed using steel angle iron, either welded or bolted into a box frame structure 22. To the frame 22 is welded or bolted sheet metal side panels 24 to enclose one or more of the sides of the frame 22. A front face 26 of the sidewall means 20 is preferably made to accept a plurality of drawers or bins, or may remain open for easier storage space access. In practice the box 10 may be constructed as a rectangular shape, as shown, or may alternately be round or triangular, or other shapes in accordance with each application.

A top surface 30 extends over the sidewall means 20, and may be formed as a simple tray as shown, or may comprise a plurality of smaller bins, trays, supports, or other structures as necessary for holding parts, tools or other items. A storage shelf means 40 is preferably positioned below the top surface 30 and may comprise one or more surfaces for holding parts, as mentioned. The sidewall means 20 provides access to the storage shelf means 40 via the openings shown or any other form of aperture as required for such access. Slideable storage means 28 may be provided for extending laterally from the sidewall means 20 for access to storage, and may comprise trays, drawers or bins 28A as is well known in the art.

A roller means 50 is positioned for supporting the box 10 so that it may be moved from place to place on the floor. Such a roller means 50 is preferably the caster wheels illustrated, but may be any other well known form of roller support.

A vertical tray support means 60, preferably a single shaft as shown, is rotationally engaged with the box, preferably at a front corner of the box as shown, and extends upwardly above the top surface 30. The tray support means 60, may alternately be more than one shaft, as for instance one said shaft positioned at each corner of the cart. Such variations are merely obvious versions and extensions of the present invention illustrated and therefore will not be further described.

Figure 2:
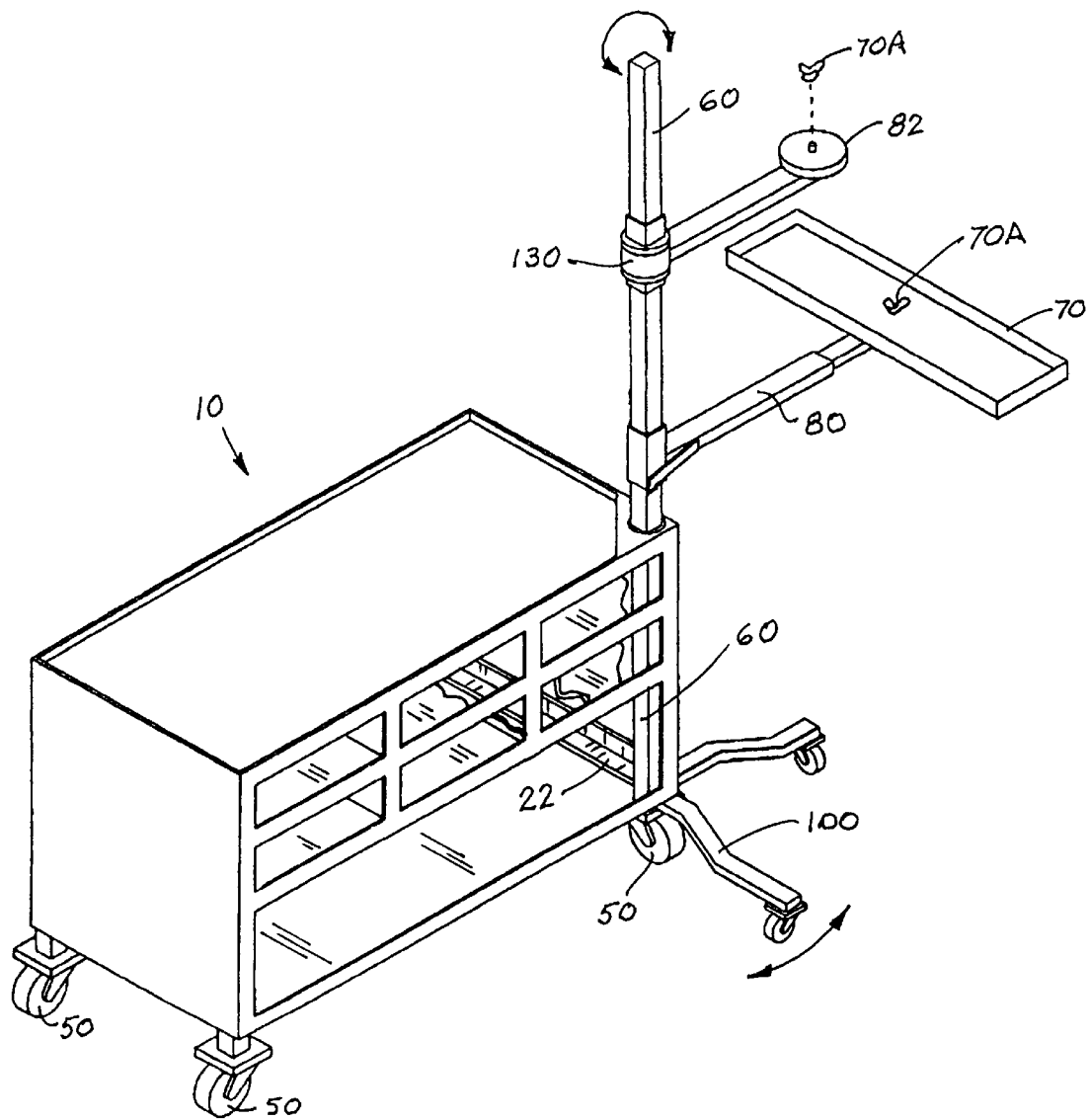
FIG. 2 is a perspective view of the preferred embodiment of the present invention, showing the movable trays in positions to one side of the top surface of the cart.

A tray means 70, preferably two trays as shown in FIG. 1, but which may be any number of such trays, is engaged with the tray support means 60 so as to be horizontally positionable as the tray support means 60 is rotated within the box. Such an engagement means may be any clamping or fastening means known in the art which provides a strong structural support of the tray means 70 on the shaft support means 60. The tray means 70 thereby may be positioned above the top surface 30 of the box, as shown in FIG. 1, or may be rotated to any position lateral to the box, as shown in FIG. 2, as desired for work convenience. The tray means 70 is also vertically positionable as desired. Vertical positioning may be achieved by any one or more of a wide range of well known techniques, such as providing a series of vertical holes in the tray support means 60, and pinning a support arm means 80 of the tray means 70 to a selected one of the holes (not shown). An alternate approach is to provide a friction fit between the support arm means 80 and the tray support means 60 so that vertical movement thereof is only possible with upward or downward force on the arm's point of coupling to the tray support means 60.

Figure 3:
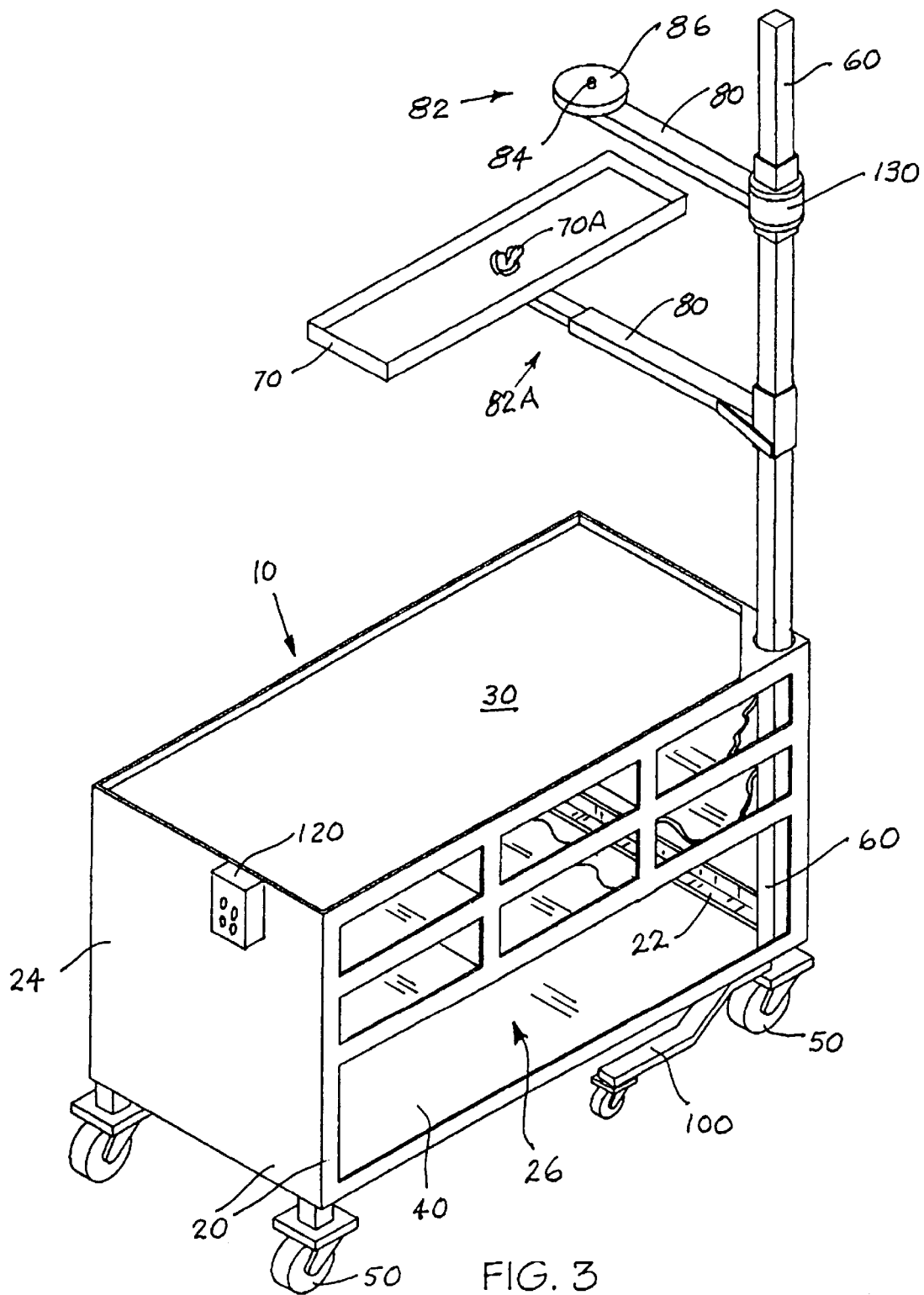
FIG. 3 is a perspective view of the preferred embodiment of the present invention, showing alternate means for supporting the movable trays.

Such positioning places tools and parts within convenient reach. It should be clear that the tray means 70 may be of any size and shape. In a preferred manner of mounting of the tray means 70 to its support arm means 80, as shown in FIGS. 2 and 3, the support arm means 80 provides a quick connect means 82 for engaging and disengaging the tray means 70. This may take the form of a threaded upwardly directed stud 84 and preferably includes a relatively wide upwardly facing base surface 86 for supporting the tray means 70. In this way, the tray means 70 may be rotated to a preferred position on the base surface 86 and then locked into place with a wing nut 70A or other fastener, for example. Such quick connect means 82 enables the interchange and positioning of a variety of utility tray types by the simple expedient of a single fastener device.

Preferably, the tray means 70 is attached to the tray support means 60 by the support arm means 80, as described, extending and supporting the tray means 70 away from the tray support means 60 to achieve a greater range of tray positioning. The support arm means 80 may have a rotational elbow means 90, as shown in FIG. 1, so that the tray means 70 may be horizontally rotated with respect to the support arm means 80 over a range of at least 45 angular degrees. In actuality, a rotational range of at least 180 angular degrees may be achieved with the rotational elbow means 90 shown in FIG. 1. These elbows provide a pivot pin 92 engaged with two parallel plates 94A and 94B, within which is positioned a structural brace 96 extending from the tray means 70. The brace 96 rotates within the struts 94A and 94B, supported by the pivot pin 92.

In FIG. 3 is shown an alternate support arm means 80 which provides a linear telescoping means 82A, simply a pair of square tubes which are engage so that one slides within the other, so that the tray means 70 may be extended outwardly from the tray support means 60 over an extended range of linear motion.

The instant invention further preferably provides an outrigger support means 100 engaged with the vertical tray support means 60 and rotatable with it. Such a outrigger support means 100 is preferably in contact with the floor and is rotationally positionable for providing lateral stabilizing support to the box 10 and is indexed with the vertical tray support means 60 so as to always be positioned below the tray means 70 as the tray support means 60 is rotated. This is clearly shown in FIG. 2. Notice also, that as the tray means 70 is positioned inboard, as shown in FIG. 3, the outrigger support means 100 moves to a position below the box 10 and is therefore stored in a position that is out of the way of foot traffic. In this manner the box 10 will not tip due to an excessive cantilevered load. The preferred embodiment of the outrigger support means 100, as shown in FIG. 2, is a pair of legs extending laterally from the shaft support means 60, at its lower end below the storage shelf means 40. The outrigger support means 100 is integral with the tray support means 60 so that these two critical parts rotate together and represent a rigid structure, any unbalanced force which might tend to cause tilting of the box 10 toward the outrigger support means 100 is immediately thwarted by the lateral position of the outrigger support means 100. The outrigger support means 100 preferably has caster wheels in contact with the floor. Alternately, the outrigger support means 100 may be a telescoping extension of the box wherein a horizontal leg may be extended from the box 10 laterally for improved stability of the box 10. The latter embodiment is well known in the construction field for stabilizing cranes and other construction equipment with eccentric forces.

Further the invention may include an audible alarm means 120 fixed to the box for enabling an alarm sound if the box 10 starts to tip. Such an alarm means 120 may be a simple series electrical circuit including a level sensing device, such as a mercury switch, interconnected to a battery and a electromechanical buzzer of any well known type such as a door bell. In the present embodiment, the mercury switch would be fixed in an upright orientation so that it is not made. If the box 10 were to start to tilt, the mercury switch would tilt with it, and at some point the mercury switch would be made so as to cause the buzzer or bell to sound. It is possible to place the audible alarm means 120 such that an early warning would allow catching the box 10 before it overturned.

Tray means 70 may be engaged with tray rotation means 130 at the vertical tray support means 60 so as to enable rotation over a 360 degree horizontal angular range of motion around the vertical tray support means 60 without the tray support means 60 rotating, and further may be vertically positionable on the vertical tray support means 60 to a desired elevation above the top surface 30 in the manner described above. Such a mounting is not desirable if tray means 70 is to carry a heavy load that might upset the box 10 since tray rotation means 130 does not cause the outrigger support means 100 to deploy.

A vertical support bar means 140, as shown in FIG. 1, is positioned in parallel to the vertical tray support means 60 and is spaced apart therefrom, and extends rigidly upwardly from the box. The support arm means 80 may provide a clasping means 142, such as any common clamp, for engaging the support arm means 80 for rigid positioning of the tray means 70 between the support bar means 140 and the tray support means 60 so as to provide improved engagement and support to the tray means 70 when it is necessary to support heavy weight.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A utility tool cart apparatus comprising:
    a box having a sidewall means supporting;
        (i) a top surface extending over the sidewall means, and
        (ii) a storage means positioned below the top surface, the sidewall means providing access to the storage means;
    a roller means positioned for supporting the box for movement thereof on a floor;
    a vertical tray support means rotationally engaged with the box and extending upwardly above the top surface;
    a tray means engaged with the tray support means so as to be horizontally positionable as the tray support means is rotated, the tray means thereby being positionable above the top surface of the box or lateral to the box as desired;
    an outrigger support means engaged with the tray support means and rotatable therewith, the outrigger support means adapted to contact the floor in a position for providing lateral stabilizing support to the box, and indexed with the tray support means so as to always be positioned below the tray means as the tray support means is rotated.

2. The apparatus of claim 1 wherein the tray means is attached to the tray support means by a support arm means extending and supporting the tray means away from the tray support means.

3. The apparatus of claim 2 wherein the support arm means has a rotational elbow means so that the tray means may be horizontally rotated with respect to the support arm means over a range of at least 45 angular degrees.

4. The apparatus of claim 3 further including a vertical support bar means positioned in parallel to the vertical fray support means, spaced apart therefrom, and extending rigidly upwardly and integrally from the box, the elbow means providing a clasping means for engaging the support bar means for rigid positioning of the tray means between the support bar means and the tray support means.

5. The apparatus of claim 2 wherein the support arm means has a linear telescoping means so that the tray means may be extended outwardly from the tray support means over an extended range of linear motion.

6. The apparatus of claim 2 wherein the support arm means provides a quick connect means for engaging and disengaging the tray means.

7. The apparatus of claim 1 wherein the storage means provides at least one slideable storage means extendible laterally from the sidewall means for access to the storage means.

8. The apparatus of claim 7 wherein the at least one slideable storage means is at least one drawer.

9. The apparatus of claim 7 wherein the at least one slideable storage means is at least one bin.

10. The apparatus of claim 1 further providing a tray rotation means engaged with the vertical tray support means so as to position the tray means over a 360 degree horizontal angular range of motion around the vertical tray support means, and further vertically positionable on the vertical tray support means to a desired elevation above the top surface.

11. The apparatus of claim 1 further including an audible alarm means fixed to the box and enabled for producing an alarm sound if the box starts to tip.

* * * * *